United States Patent [19]
Friedlander et al.

[11] Patent Number: 6,054,502
[45] Date of Patent: Apr. 25, 2000

[54] RADIATION CURABLE COMPOSITONS BASED ON UNSATURATED POLYESTERS AND COMPOUNDS HAVING AT LEAST TWO VINYL ETHER GROUPS

[75] Inventors: Charles B. Friedlander, Glenshaw; David A. Diehl, Pittsburgh, both of Pa.

[73] Assignee: PPG Industries Ohio, Inc., Cleveland, Ohio

[21] Appl. No.: 09/046,390

[22] Filed: Mar. 23, 1998

Related U.S. Application Data

[63] Continuation of application No. 08/621,280, Mar. 22, 1996, which is a continuation of application No. 08/166,665, Dec. 10, 1993, Pat. No. 5,536,760, which is a continuation of application No. 07/559,921, Jul. 30, 1990, abandoned, which is a continuation of application No. 07/377,513, Jul. 10, 1989, abandoned, which is a continuation of application No. 07/138,406, Dec. 28, 1987, abandoned.

[51] Int. Cl.[7] ................. C08F 2/46; C08F 2/50; C08L 67/06
[52] U.S. Cl. .............. 522/96; 522/98; 522/107; 522/181; 522/44; 525/44; 526/323; 526/333; 427/496; 427/508
[58] Field of Search ................. 522/96, 98, 107, 522/181, 93; 525/44; 526/323, 333; 427/496, 508

[56] References Cited

U.S. PATENT DOCUMENTS

| | | | |
|---|---|---|---|
| 2,288,315 | 6/1942 | D'Alello | 260/42 |
| 2,387,934 | 10/1945 | Muskat et al. | 260/80 |
| 2,403,113 | 7/1946 | Muskat et al. | 260/78 |
| 2,407,266 | 9/1946 | Alberts | 24/200 |
| 2,407,479 | 9/1946 | D'Alelio | 260/42 |
| 2,437,508 | 3/1948 | D'Alelio | 260/78.3 |
| 2,962,533 | 11/1960 | Hardy et al. | 260/591 |
| 3,176,050 | 3/1965 | Jen et al. | 260/861 |
| 3,311,574 | 3/1967 | Samuel et al. | 260/2.5 |
| 3,721,722 | 3/1973 | Baum | 260/862 |
| 3,770,602 | 11/1973 | D'Alelio | 204/159.15 |
| 3,877,971 | 4/1975 | Guthrie et al. | 427/53 |
| 3,898,144 | 8/1975 | Rudolph et al. | 204/159.15 |
| 4,017,652 | 4/1977 | Gruber | 427/54 |
| 4,018,940 | 4/1977 | Morgan | 427/54 |
| 4,151,148 | 4/1979 | Chasin et al. | 260/29.6 |
| 4,172,859 | 10/1979 | Epstein | 428/402 |
| 4,200,762 | 4/1980 | Schmidle | 560/26 |
| 4,205,139 | 5/1980 | Barzynski et al. | 525/38 |
| 4,265,723 | 5/1981 | Hess et al. | 204/159.23 |
| 4,288,571 | 9/1981 | Comstock et al. | 525/170 |
| 4,298,738 | 11/1981 | Lechtken et al. | 546/22 |
| 4,374,215 | 2/1983 | Atkins | 523/514 |
| 4,434,035 | 2/1984 | Eichler et al. | 204/159.13 |
| 4,447,520 | 5/1984 | Henne et al. | 430/281 |
| 4,537,855 | 8/1985 | Ide | 430/285 |
| 4,606,994 | 8/1986 | Illers et al. | 430/300 |
| 4,720,319 | 1/1988 | Gasser | 156/273.5 |
| 4,721,734 | 1/1988 | Gehlhaus et al. | 522/8 |
| 4,749,807 | 6/1988 | Lapin et al. | 560/91 |
| 4,751,273 | 6/1988 | Lapin et al. | 525/455 |
| 4,753,817 | 6/1988 | Meixner et al. | 427/54.1 |
| 4,761,435 | 8/1988 | Murphy et al. | 522/46 |
| 4,829,127 | 5/1989 | Muramoto et al. | 525/309 |
| 4,837,271 | 6/1989 | Brindopke | 525/330.3 |
| 4,842,936 | 6/1989 | Kashihara et al. | 428/407 |
| 4,920,156 | 4/1990 | Koleske et al. | 522/31 |
| 4,999,216 | 3/1991 | Gaske et al. | 427/44 |
| 5,334,456 | 8/1994 | Noren et al. | 428/431 |

FOREIGN PATENT DOCUMENTS

| | | |
|---|---|---|
| 198458 | 10/1986 | European Pat. Off. . |
| 322808 | 7/1989 | European Pat. Off. . |
| 1221008 | 5/1960 | France . |
| 96195 | 5/1978 | Poland . |
| 947701 | 1/1964 | United Kingdom . |
| 90/01512 | 2/1990 | WIPO . |

OTHER PUBLICATIONS

Photopolymerization of Surface Coatings, C. G. Roffey, 1982.

GAF Corporation, Triethylene Glycol Divinyl Ether (Tegdve), A New Reactive Diluent for Cationic Initiated Radiation Curable Products, not dated.

GAF Corporation, Vinyl Ethers for Cationic UV Curing, J. A. Dougherty, et al, not dated.

*Primary Examiner*—Susan W. Berman
*Attorney, Agent, or Firm*—Dennis G. Millman

[57] ABSTRACT

A radiation curable coating composition comprising: (A) an unsaturated polyester component; and (B) a non-polymerized, cocurable vinyl ether component. Component (B) may be separate from or structurally incorporated in the unsaturated polyester component. The vinyl ether component contains an average of at least two vinyl ether groups per molecule of the vinyl ether component.

20 Claims, No Drawings

RADIATION CURABLE COMPOSITONS BASED ON UNSATURATED POLYESTERS AND COMPOUNDS HAVING AT LEAST TWO VINYL ETHER GROUPS

This is a continuation of Ser. No. 08/621,280, filed Mar. 22, 1996,which is a continuation of Ser. No. 08/166,665, filed Dec. 10, 1993, issued as U.S. Pat. No. 5,536,760, which is a continuation of Ser. No. 559,921, filed Jul. 30, 1990, abandoned, which is a continuation of Ser. No. 377,513, filed Jul. 10, 1989, abandoned, which is a continuation of Ser. No. 138,406, filed Dec. 28, 1987, abandoned.

BACKGROUND AND FIELD OF THE INVENTION

The use of radiation curable coating compositions based on unsaturated polyesters is limited by the rate of radiation cure and degree of radiation cure in air of known compositions containing unsaturated polyesters. For example, liquid films of known unsaturated polyesters cured with styrene typically require doses of 10 to 20 megarads of ionizing radiation (electron beam) for cure or, when cured using actinic radiation (ultraviolet light), cure at typical rates of from 5 to 10 feet/minute/lamp upon exposure to ultraviolet light (UV) from a medium pressure mercury vapor lamp operating at 200 watts/inch at a distance of about 4 inches from the surface of the wet film. Also such known compositions tend to exhibit disadvantages in surface curing characteristics.

The present invention is primarily directed to improving the radiation curing properties of liquid, compositions based on unsaturated polyester polymers and unsaturated polyester oligomers. Other objects of the invention will become apparent to the reader infra.

SUMMARY OF THE INVENTION

The present invention is for a liquid, radiation curable composition comprising: (A) an unsaturated polyester component containing an unsaturated polyester polymer, an unsaturated polyester oligomer or a mixture thereof; and (B) a non-polymerized, cocurable vinyl ether component which may be separate from or structurally incorporated in the unsaturated polyester component, provided that the vinyl ether component contains an average of at least two vinyl ether groups per molecule of the vinyl ether component.

The present invention is also for a method of coating comprising: applying to a substrate a film of a liquid, radiation curable composition of the invention, and curing the composition through its thickness to a tack-free state by exposing the film to ionizing radiation and/or ultraviolet light.

DETAILED DESCRIPTION OF THE INVENTION

A composition of the invention is liquid and is capable of being cured by the application of ionizing radiation, such as electron beam radiation, or actinic light, such as ultraviolet light (UV). The composition is liquid such that it can be applied to a substrate utilizing conventional coating application techniques such as roll coating, curtain coating, doctor blade coating, and/or spray coating. Generally, a composition of the invention will have a viscosity at 25 degrees Celsius (°C.) of from 200 to 20,000 centipoises (cp), preferably from 200 to 4,000 cp. Moreover, vinyl unsaturation of the vinyl ether component which is present in a liquid composition of the invention in combination with the unsaturated polyester component, is available for curing (crosslinking) with ethylenic unsaturation in the backbone of the unsaturated polyester component.

The unsaturated polyester component of the liquid, radiation curable composition comprises an unsaturated polyester resin. The unsaturated (ethylenically unsaturated) polyester resin can be an unsaturated polyester polymer, an unsaturated polyester oligomer or a mixture thereof. The preparation of unsaturated polyesters, for example by the reaction of unsaturated polycarboxylic acid or anhydride with polyhydric alcohol, is well-known in the art. Processes for making unsaturated polyesters include batch processes and continuous processes. As used herein, the term "unsaturated polyester" is to be distinguished from unsaturated alkyd resins such as drying-oil modified alkyds.

Unsaturated polyesters for compositions of the invention ordinarily are esterification products of ethylenically unsaturated carboxylic acids and organic polyhydric alcohols (organic polyols). Usually, an unsaturated carboxylic acid having an acid functionality of at least two, more particularly a dicarboxylic acid or its anhydride, is utilized as a starting reactant. Examples of unsaturated dicarboxylic acids and anhydrides include: maleic acid, maleic anhydride, fumaric acid and itaconic arid. Maleic anhydride is a desirable dicarboxylic component to make the unsaturated polyester resin since it is relatively inexpensive. However, the maleate esters do not copolymerize with monomers such as vinyl ethers as readily as do the fumarate esters (i.e., esters derived from the trans isomer of maleic acid, i.e., fumaric acid). Accordingly, fumarate esters are preferred for making the unsaturated polyester for a composition of the invention.

Unsaturated polyesters for a composition of the invention, where desired, also can be prepared utilizing a saturated polycarboxylic acid as a portion of the polycarboxylic component. Preferred unsaturated polyester resins for the present invention, however, typically are prepared utilizing just the unsaturated polycarboxylic acid or its anhydride with the polyhydric alcohol component. Examples of saturated polycarboxylic acids which optionally may be used include: phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, and 2,2-dimethylglutaric acid. Of course, anhydrides of the aforementioned acids, where they exist, also can be utilized.

Examples of organic polyols suitable for preparing the unsaturated polyester resin include: diethylene glycol, ethylene glycol, propylene glycol, dipropylene glycol, butylene glycol, glycerol, trimethylolpropane, pentaerythritol, sorbitol, 1,6-hexanediol, 1,4-cyclohexanediol, 1,4-cyclohexanedimethanol, 1,2-bis(hydroxyethyl)cyclohexane, and 2,2-dimethyl-3-hydroxypropyl-2,2-dimethyl-3-hydroxypropionate. Organic polyols which are diols are preferred. Diethylene glycol is particularly preferred since it is readily available and is relatively inexpensive. While organic polyols having a hydroxyl functionality of greater than 2 may be employed in the preparation of the unsaturated polyester resin, it is preferred that the major portion, if not all of the unsaturated polyester resin, be comprised of unsaturated polyester molecules which are linear; hence the preference for diols.

The molecular weight of unsaturated polyester resins suitable for a composition of the invention may vary widely.

However, generally the unsaturated polyester resin has a peak molecular weight, as measured by gel permeation chromatography using a polystyrene standard, of from 800 to 50,000, preferably of from 1,200 to 5,000. The unsaturated polyester resins may be prepared by heating the polycarboxylic component and organic polyol component together for about 1 to 10 hours to temperatures of from about 165° C. to about 250° C., with water formed during the esterification being distilled off using a sparge of an inert gas such as nitrogen. Esterification catalysts for increasing the rate of reaction can also be used. Examples of known catalysts useful for this purpose include para-toluenesulfonic acid, butylstannoic acid, dibutyltin oxide and stannous fluoride.

Radiation curable compositions of the present invention utilize a vinyl ether component that provides an average of at least two vinyl ether groups per molecule of the vinyl ether component. The vinyl ether component may be separate from, or structurally incorporated in (as illustrated, for example, in Example 8 infra), the unsaturated component. The vinyl ether groups of the vinyl ether component are different from and cocurable with the ethylenically unsaturated moieties in the backbone of the unsaturated polyester (e.g., provided from the residue of unsaturated carboxylic acid used to make the unsaturated polyester). By "cocurable" is meant that the vinyl ether groups are reactive with ethylenic unsaturation derived from the unsaturated polyester upon exposure of a composition of the invention to ionizing radiation (electron beam radiation) and/or ultraviolet light. It will be understood that when a composition of the invention is to be cured utilizing ultraviolet light, a photoinitiator and/or photosensitizer will be combined with the composition of the invention either prior to or at the time of UV curing.

The vinyl ether component and unsaturated polyester component are employed in the liquid composition of the invention in relative amounts to provide crosslinking via reaction of ethylenic unsaturation provided from the unsaturated polyester component with vinyl unsaturation provided by the vinyl ether component upon free-radical curing of the liquid composition, as for example upon exposure to electron beam radiation or ultraviolet light. Generally, in a composition of the invention the ratio of carbon-carbon double bond equivalents from the vinyl ether component to carbon-carbon double bond equivalents from the unsaturated polyester component is from 0.1:1.0 to 1.5:1.0, preferably from 0.25:1.0 to 1.1:1.0. For most coatings purposes, it is desirable that the aforesaid ratio of carbon-carbon double bond equivalents not go much above a 1:1 ratio since the excess, low molecular weight vinyl ether may tend to undesirably plasticize the resulting film.

In one embodiment of the invention, an unsaturated polyester resin, which does not have vinyl ether groups incorporated in the structure of the polyester, is utilized in combination with one or more vinyl ether compounds containing at least two vinyl ether groups per molecule. A variety of vinyl ether compounds can be employed in this embodiment of the invention provided that the vinyl ether compound contains at least two reactive vinyl ether groups.

Examples of vinyl ether compounds include vinyl ethers made in known manner from di-, tri- or tetra-functional organic polyol, acetylene and a basic catalyst under high pressure. Specific examples include: tripropylene glycol divinyl ether, diethylene glycol divinyl ether, 1,4-butanediol divinyl ether, tetraethylene glycol divinyl ether and the like.

In another embodiment of the invention, vinyl ether groups of the vinyl ether component are structurally incorporated in the unsaturated polyester component. For example, a hydroxy functional vinyl ether such as hydroxybutyl vinyl ether can be reacted with an organic diisocyanate such as isophorone diisocyanate in a stoichiometric ratio (e.g., moles OH/moles NCO of about 1:2) to provide a half-capped isocyanate adduct. Thereafter, residual isocyanato functionality of the half-capped diisocyanate can be reacted with hydroxyl functionality provided by an unsaturated polyester polyol (for example prepared by reacting unsaturated carboxylic acid or anhydride with excess polyol) so as to structurally incorporate an average vinyl ether functionality of at least two in the unsaturated polyester component. Examples of unsaturated carboxylic acids and unsaturated carboxylic acid anhydrides as well as organic polyols suitable for preparing hydroxyl-functional unsaturated polyester resins include those described herein previously. Examples of organic diisocyanates include: toluene-2,4-diisocyanate, toluene-2,6-diisocyanate, and mixtures thereof; diphenylmethane-4,4'-diisocyanate, diphenylmethane-2,4'-diisocyanate and mixtures thereof; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate; dodecane-1,1 2-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. The resulting unsaturated polyester component (also now containing urethane moieties), and having an average vinyl ether functionality of at least two, usually is free of unreacted NCO groups.

Optionally, a liquid, radiation curable composition of the invention additionally may contain other ethylenically unsaturated monomers or oligomers examples of which include: other vinyl monomers such as vinyl acetate, styrene, vinyl toluene, divinyl benzene, methylvinyl ether, ethylvinyl ether and butylvinyl ether; acrylic and methacrylic esters such as methyl (meth)acrylate, ethyl (meth) acrylate, isopropyl (meth)acrylate, n-butyl (meth)acrylate, isobutyl (meth)acrylate, 2-ethylhexyl (meth)acrylate, 2-hydroxyethyl (meth)acrylate, glycidyl (meth)acrylate, ethylene glycol di(meth)acrylate, diethylene glycol di(meth) acrylate, tetraethylene glycol di(meth)acrylate, glycerol di(meth)acrylate, glycerol tri(meth)acrylate, 1,3-propylene glycol di(meth)acrylate, dipropylene glycol di(meth) acrylate, 1,4-butanediol di(meth)acrylate, 1,2,4-butanetriol tri(meth)acrylate, 1,6-hexanediol di(meth)acrylate, 1,4-cyclohexanediol di(meth)acrylate, 1,4-benzenediol di(meth) acrylate, pentaerythritol tetra(meth)acrylate, 1,5-pentanediol di(meth)acrylate, trimethylolpropane di(meth)acrylate, trimethylolpropane tri(meth)acrylate, 2,2-dimethyl-3-hydroxypropyl-2,2-dimethyl-3-hydroxypropionate, isobornyl (meth)acrylate and tetrahydrofurfuryl (meth) acrylate; (meth)acrylates derived from aromatic glycidyl ethers such as bisphenol-A-diglycidyl ether and aliphatic glycidyl ethers such as butanediol diglycidyl ether, specific examples of which include 1,4-butanediol diglycidylether di(meth)acrylate, bisphenol-A-diglycidylether di(meth) acrylate and neopentylglycol diglycidylether di(meth) acrylate; and acrylic or methacrylic amides such as (meth)

acrylamide, diacetone (meth)acrylamide, N(beta-hydroxyethyl) (meth)acrylamide, N,N-bis(beta-hydroxyethyl) (meth)acrylamide, methylene bis(meth)acrylamide, 1,6-hexamethylene bis(meth)acrylamide, diethylenetriamine tris(meth)acrylamide, bis(gamma-(meth)acrylamidepropoxy) ethane and beta-(meth)acrylamide ethylacrylate.

Liquid compositions of the invention are particularly suitable for cure by exposure to ionizing radiation and/or ultraviolet light.

Ionizing radiation is radiation having an energy at least sufficient to produce ions either directly or indirectly in a medium composed of common materials such as air or water, and includes for example accelerated electrons as produced by generally known electron beam devices. When electron beam devices are used to cure a composition of the invention, the energy of the accelerated electrons typically ranges from about 100,000 electron volts to about 300,000 electron volts. The amount of ionizing radiation in rads for curing a composition of the invention will vary depending on the such factors as the particular formulation of the radiation curable composition, thickness of the applied layer of coating composition on the substrate, temperature of the composition, and the like. However, an advantage of compositions of the invention is their excellent degree of cure at low doses of electron beam radiation. Generally, a 1 mil thick wet film of a composition of the invention can be cured in air through its thickness to a tack-free state upon exposure to from 0.5 to 5 megarads of ionizing radiation.

Ultraviolet radiation from any suitable source which emits ultraviolet light having a wavelength ranging from about 180 to about 400 nanometers may be employed to cure a composition of the invention. Because such ultraviolet light possesses insufficient energy to produce ions in a medium composed of common materials such as air or water, it is considered to be nonionizing radiation. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Preferred are ultraviolet light emitting lamps of the medium pressure mercury vapor type. Such lamps usually have fused quartz envelopes and are ordinarily in the form of long tubes having an electrode at both ends. Typically, preferred medium pressure mercury lamps usually employed to cure a composition of the invention have outputs of about 200 watts per inch across the length of the tube. Another advantage of compositions of the invention is their excellent degree of cure in air at relatively low energy exposure in ultraviolet light. Generally, a 1 mil thick wet film of a composition of the invention, provided it further comprises a photocuring promoter such as a photoinitiator and/or a photosensitizer, can be cured in air through its thickness to a tack-free state upon exposure to ultraviolet light by passing the film at a rate of 20 feet per minute or more under four or fewer medium pressure mercury vapor lamps operating at 200 watts per inch at a distance of 4 inches from the surface of the wet film. Photoinitiators and photosensitizers for use in ultraviolet light curable compositions are generally known in the art of UV curable compositions. Examples of photosensitizers include benzophenone, anthraquinone, and thioxanthone. Examples of photoinitiators include isobutyl benzoin ether, mixtures of butyl isomers of butyl benzoin ether, alpha,alpha-diethoxyacetophenone, and alpha,alpha-dimethoxy-alpha-phenylacetophenone. Other examples of photoinitiators and photosensitizers can be found in U.S. Pat. No. 4,017,652.

Although it is particularly preferred to cure compositions of the invention by UV and/or ionizing radiation, where desired, they may be thermally cured in the presence of a thermal free radical initiator. Examples include the generally known thermal initiators for curing unsaturated polyesters, some specific examples of which include peroxides such as benzoyl peroxide, methyl ethyl ketone peroxide, cumene hydroperoxide, cyclohexanone peroxide, 2,4-dichlorobenzoyl peroxide, bis(p-bromobenzoyl) peroxide and acetyl peroxide.

Where desired, a thermal polymerization inhibitor may be utilized in a composition of the invention. Examples of thermal polymerization inhibitors include phenolic compounds such as di-tertiary-butyl paracresol, and compounds containing secondary or tertiary nitrogen atoms.

A composition of the invention may also contain a solvent such as conventional aliphatic and aromatic solvents or diluents known in the art.

Where desired, a composition of the invention may also contain pigment. When it is desired to cure the composition with ultraviolet light, the pigment utilized is typically an ultraviolet light transparent pigment. The phrase "ultraviolet light transparent" is used to mean that the pigment does not substantially interfere with UV curing of the composition. Examples of ultraviolet light transparent pigments include: talc, calcium carbonate, aluminum silicate, magnesium silicate, barytes and silica ($SiO_2$). Coloring pigments generally employed to impart color in non-UV cured, coating compositions typically absorb or block ultraviolet light thereby interfering with UV curing of the composition. Accordingly, where some degree of color tinting of the composition is desired, such conventional coloring pigments typically are employed in only limited amounts when cure is to be effected utilizing UV.

The liquid, radiation curable compositions of the invention are especially useful as radiation curable coating compositions. They can be applied to a variety of substrates, examples of which include wood, paper, particleboard, chipboard, metals, metals having primers thereon, glass, plastics, and metallized plastics. The radiation curable compositions may be applied by any known means, for example, brushing, dipping, roll coating, doctor blade coating, spraying, curtain coating, etc. They may be preliminarily dried to remove solvent if desired and then cured by radiation.

The examples which follow are submitted for the purpose of further illustrating the nature of the invention in its preferred embodiments.

As used in the body of the specification, examples, and claims, all percents, ratios and parts are by weight unless otherwise specifically indicated. Wherever used herein, "pbw" means "parts by weight."

EXAMPLE 1

This example illustrates the preparation of an unsaturated polyester resin utilized in a coating composition of the invention.

A reaction vessel equipped with means for steam distillation and a nitrogen sparge is charged with 1710.9 grams (g) fumaric acid, 1107.5 g propyleneglycol, 463.5 g diethyleneglycol, 0.65 g methyl p-benzoquinone, 3.2 g dibutyltin oxide and 3.0 g triphenyl phosphite. The charge is gradually heated to 212 degrees Celsius (°C.) while a total of 362 milliliters (ml) of distillate containing water is removed at a head temperature not exceeding 100° C. The resulting product is an unsaturated polyester resin having an acid value of 8.1 and a Gardner-Holdt bubble tube viscosity of E- at 60 percent by weight solids in ethyleneglycol monoethyl ether. The unsaturated polyester is cooled to 80° C. at which temperature 30.0 g of N-hydroxyethyl ethylenimine is added to the polyester resin. The N-hydroxyethylethylenimine is reacted with the unsaturated polyester until the acid value of the product stalls at a value of 3.4.

EXAMPLES 2 and 3

These examples illustrate the preparation and radiation curing of two coating compositions of the invention.

Two coating compositions of the invention are prepared by mixing the ingredients set forth in the following TABLE 1.

TABLE 1

| | Amounts in grams | |
|---|---|---|
| Composition | Example 2 | Example 3 |
| (1) Unsaturated Polyester of Example 1 | 75.0 | 75.0 |
| (2) Triethyleneglycol divinylether | 25.0 | 25.0 |
| (3) alpha,alpha-Diethoxyacetophenone[1] | 0.0 | 2.0 |
| (4) Benzophenone[2] | 0.0 | 2.0 |

[1]A photoinitiator.
[2]A photosensitizer.

Each of four samples of the composition of Example 2 (herein designated Samples 2a, 2b, 2c and 2d) and two samples of the composition of Example 3 (herein designated Samples 3a and 3b) are drawn down with a 5 mil bar on filled particleboard to provide wet films having a thickness of 2.5 mils (0.064 mm). The films are cured as set forth in the following TABLE 2.

TABLE 2

| Sample | Curing Conditions | Remarks |
|---|---|---|
| 2a | Electro beam (EB) in nitrogen @ 3 megarads (MR)[1] | Results in a hard, tough, highly glossy, somewhat brittle film. |
| 2b | EB in nitrogen @ 2 MR | Results in a hard, tough, highly glossy, somewhat brittle film. |
| 2c | EB in air @ 3 MR | Results in a highly glossy film with good through-cure (slightly "greasy" surface). |
| 2d | EB in air @ 3 MR followed by ultraviolet light (UV) in air (4 lamps; 40 ft/min)[2] | Results in a hard, tough film with slightly lower gloss, slight initial mar and slight mottling. |
| 3a | UV in air (4 lamps; 40 ft/min)[3] | Results in a hard, tough, highly glossy film with no mottling. |
| 3b | UV in air (4 lamps; 60 ft/min)[4] | Results in a hard, tough, highly glossy film with no mottling. |

[1]The film is irradiated in an atmosphere containing nitrogen with a total dose of 3 megarads of electron beam radiation.
[2]The film is first exposed to a total dose of 3 megarads of electron beam radiation in ambient air followed by exposure to ultraviolet light by passing the film at a rate of 40 feet per minute beneath 4 medium pressure, mercury vapor lamps each operating at 200 watts/inch at a distance of four inches from the surface of the film.
[3]The film is irradiated with ultraviolet light by passing the film at a rate of 40 feet per minute beneath 4 medium pressure, mercury vapor lamps each operating at 200 watts/inch at a distance of four inches from the surface of the film.
[4]Same as footnote 3 except a speed of 60 feet per minute is utilized.
It should be noted that all of the films from Samples 2a, 2b, 2c, 2d, 3a and 3b additionally post-cured in air to even harder films.

EXAMPLE 4

This example illustrates the preparation of an unsaturated polyester resin utilized in coating compositions of the invention and in a comparative coating composition.

A reaction vessel equipped with means for steam distillation and a nitrogen sparge is charged with 1160 g (10 moles) fumaric acid, 1484 g (14 moles) diethyleneglycol and 0.6 g butylstannoic acid. The charge is gradually heated to 209 degrees Celsius (°C.) while a total of 361 ml of distillate containing water is removed at a head temperature not exceeding 102° C. The resulting product is an unsaturated polyester resin having an acid value of 3.6; a Gardner-Holdt bubble tube viscosity of Z-; a weight average molecular weight of 4813 measured by gel permeation chromatography (GPC) using a polystyrene standard, and a polydispersity index of 3.18.

EXAMPLES 5, 6 and 7

These examples illustrate the preparation and radiation curing of two coating compositions of the invention and a comparative composition.

Two coating composition of the invention (Examples 5 and 6) and a comparative coating composition (Example 7) are prepared by mixing the ingredients set forth in the following TABLE 3.

TABLE 3

| | Amounts in grams | | |
|---|---|---|---|
| Composition | Example 5 | Example 6 | Example 7 |
| (1) Unsaturated Polyester of Example 4 | 75.0 | 75.0 | 0.0 |
| (2) Triethyleneglycol divinylether | 25.0 | 25.0 | 10.0 |
| (3) Isobutyl benzoin ether[1] | 0.0 | 2.0 | 0.2 |
| (4) Benzophenone[2] | 0.0 | 2.0 | 0.2 |

[1]A photoinitiator.
[2]A photosensitizer.

Two samples of each of the compositions of Examples 5 through 7 (herein designated Samples 5a, 5b, 6a, 6b, 7a and 7b respectively) are drawn down with a 5 mil bar on filled particleboard to provide wet films having a thickness of 2.5 mils (0.064 mm). The films are cured as set forth in the following TABLE 4.

TABLE 4

| Sample | Curing Conditions | Remarks |
|---|---|---|
| 5a | (EB) in nitrogen @ 3 MR[1] | Results in a very hard, mar-free, highly glossy, somewhat brittle film having fair to good film integrity. |
| 5b | EB in nitrogen @ 2 MR[2] | Results in a hard, mar-free, highly glossy, somewhat brittle film having fair to good film integrity. |
| 6a | UV in air (4 lamps; 40 ft/min)[3] | Results in a very hard, mar-free, highly glossy, brittle film having excellent film integrity. |
| 6b | UV in air (4 lamps; 80 ft/min[4] | Results in a hard, highly glossy, brittle film having good film integrity and variable mar. |
| 7a | EB in nitrogen @ 3 MR[5] | Did not cure. Remains wet. |
| 7b | UV in air (4 lamps; 20 ft/min)[6] | Did not cure. Remains wet. |

[1]The film is irradiated in an atmosphere containing nitrogen with a total dose of 3 megarads of electron beam radiation.

TABLE 4-continued

| Sample | Curing Conditions | Remarks |
|---|---|---|

²Same as 5a except 2 megarads is used.
³The film is irradiated with ultraviolet light by passing the film at a rate of 40 feet per minute beneath 4 medium pressure, mercury vapor lamps each operating at 200 watts/inch at a distance of four inches from the surface of the film.
⁴Same as 6a except a speed of 80 feet per minute is used.
⁵Same as 5a.
⁶Same as 6a except a speed of 20 feet per minute is used.

EXAMPLE 8

This example illustrates (a) the preparation of an unsaturated polyester resin, (b) the preparation of a "half-capped" isocyanate, (c) the preparation and radiation curing of a polyester urethane composition of the invention having an average of two vinyl ether groups per molecule.

(a) A reaction vessel equipped with means for steam distillation and a nitrogen sparge is charged with 392.0 g (4.0 moles) maleic anhydride, 636.0 g (6.0 moles) diethyleneglycol, 1.0 g butylstannoic acid and 0.1 g methylhydroquinone. The charge is gradually heated to 209 degrees Celsius (°C.) while a total of 66 ml of distillate containing water is removed at a head temperature not exceeding 105° C. The resulting product is an unsaturated polyester polyol having an acid value of 1.4, a Gardner-Holdt bubble tube viscosity of Z4+, and a hydroxyl value of 158.5.

(b) A reaction vessel equipped with means for maintaining a blanket of nitrogen is charged at ambient temperature with 444.0 g (2.0 moles) isophorone diisocyanate and 0.7 g of 2,6-di-tertiarybutyl-4-methylphenol. The charge is heated to 41° C. at which temperature the dropwise addition of 4-hydroxybutyl vinyl ether is begun. The dropwise addition is continued over 2 hours and 5 minutes at 41° C. until a total of 232.0 g of the 4-hydroxybutyl vinyl ether has been added. The resulting product, which is a diisocyanate "half capped" with the vinyl ether, is allowed to cool to room temperature.

(c) A reaction vessel is charged with 338.0 g (1.0 mole) of the "half capped" diisocyanate of part (b) immediately above. The charge is heated to 56° C. at which temperature the slow addition of the unsaturated polyester polyol of part (a) immediately above is begun. The addition is continued over 2 hours while maintaining the temperature between 66 and 74° C. until a total of 519.4 g (2.0 equivalents) of the unsaturated polyester polyol has been added. The reaction product, which represents a composition of the invention, is allowed to cool to room temperature. Infrared analysis of the product shows no residual isocyanato functionality. The product has a Gardner-Holdt viscosity of Z6–; a peak molecular weight of 1796, and a weight average molecular weight (GPC using a polystyrene standard) of 2924.

Two percent by weight of alpha,alpha-diethoxy acetophenone is added to the product and samples are drawn down using a No. 0.012 wire-wound bar on aluminum panels and the resulting films are allowed to flash for seven minutes at 150° F.(65.6° C.). Thereafter, the films are cured by exposing them in ambient air to UV light from four medium pressure mercury vapor lamps operating at 200 watts per inch at a distance of four inches from the surface of the film as the films are passed beneath the lamps at the rates set forth in the following TABLE 5. Properties of the resulting cured films are also summarized in TABLE 5.

TABLE 5

| Line Speed (Feet/Minute) | Remarks |
|---|---|
| 40 ft/min | Cured film does not mar. |
| 60 ft/min | Cured film does not mar. |
| 80 ft/min | Cured film mars slightly. |
| 100 ft/min | Cured film mars. |

It should be noted that a sample of the composition still radiation cures after two weeks in a "hot room" maintained at 120° F.(48.9° C.).

What is claimed is:

1. A radiation curable coating composition comprising:
    an unsaturated polyester having a plurality of maleate and/or fumarate groups; and a non-polymerized, cocurable vinyl ether component free radically reactive with said unsaturation of said polyester and selected from the group consisting of: (a) vinyl ether compounds containing an average of at least two reactive vinyl ether groups per molecule and (b) a vinyl ether containing group bonded to the polyester; the composition being free of components that would destabilize the composition under coating application conditions, whereby polymerization of the vinyl ether component is substantially avoided until cocured with the unsaturated polyester when initiated by exposure to radiation.

2. The composition of claim 1 further comprising a photoinitiator.

3. The composition of claim 1 wherein the ratio of carbon-carbon double bond equivalents of said vinyl ether groups to carbon-carbon double bond equivalents from said polyester is in a range of from 0.1:1.0 to 1.5:1.0.

4. The composition of claim 3 comprising a thermal polymerization inhibitor.

5. The composition of claim 3 wherein said unsaturated polyester comprises an unsaturated polyester polymer having a peak molecular weight, as measured by gel permeation chromatography using a polystyrene standard, in a range of from 800 to 50,000.

6. The composition of claim 5 wherein the ratio of carbon-carbon double bond equivalents of said vinyl ether groups to carbon-carbon double bond equivalents of said polyester is in a range of from 0.25:1.0 to 1.1:1.0.

7. The composition of claim 5 wherein said unsaturated polyester comprises an unsaturated polyester polymer having a peak molecular weight, as measured by gel permeation chromatography using a polystyrene standard, in a range of from 1,200 to 5,000.

8. The composition of claim 1 wherein said unsaturated polyester is an unsaturated polyester-urethane polymer, an unsaturated polyester-urethane oligomer or a mixture thereof.

9. The composition of claim 1 wherein the composition consists essentially of the unsaturated polyester and the vinyl ether component, and optionally a photoinitiator and/or a thermal polymerization inhibitor.

10. The composition of claim 1 wherein the polyester component comprises the reaction product of a polyhydric alcohol with an unsaturated carboxylic acid selected from the group consisting of maleic acid, fumaric acid, and itaconic acid.

11. The composition of claim 10 wherein the backbone of the unsaturated polyester includes a plurality of unsaturated ester groups selected from the group consisting of maleate, fumarate, and itaconate.

12. The composition of claim 11 wherein the unsaturated polyester contains a plurality of fumarate groups.

13. The composition of claim 11 wherein the vinyl ether component includes a reaction product of a di-, tri-, or tetra-functional organic polyol and acetylene.

14. The composition of claim 11 wherein the vinyl ether component includes a member selected from the group consisting of: tripropylene glycol divinyl ether, diethylene glycol divinyl ether, 1,4,-butanediol divinyl ether, and tetraethylene glycol divinyl ether.

15. A method of coating comprising:

(A) applying to a substrate a layer of a radiation curable composition containing an unsaturated polyester having a plurality of maleate and/or fumarate groups and a non-polymerized, cocurable vinyl ether component free radically reactive with said unsaturation of said polyester and selected from the group consisting of: (a) vinyl ether compounds containing an average of at least two reactive vinyl ether groups per molecule and (b) a vinyl ether containing group bonded to the polyester, the composition being free of components that would destabilize the composition under coating application conditions, whereby polymerization of the vinyl ether component is substantially avoided until cocured with the unsaturated polyester when initiated by exposure to radiation;

(B) providing the curable composition in liquid form to wet the substrate; and (C) curing said composition through its thickness to a tack-free state by means of crosslinking the polyester component using the vinyl ether groups as the primary crosslinking agent, the curing being effected by exposing said film to ionizing radiation and/or ultraviolet light.

16. The method of claim 15 wherein said composition further contains a photoinitiator.

17. The method of claim wherein said composition contains a thermal polymerization inhibitor.

18. The method of claim 15 wherein said unsaturated polyester is a polymer, an oligomer, or a mixture thereof.

19. The method of claim 15 wherein the wetting of step (B) entails providing the curable composition with a viscosity of 200 to 20,000 centipoises.

20. The method of claim 15 wherein the wetting of step (B) entails providing the curable composition with a viscosity of 200 to 4,000 centipoises.

* * * * *